United States Patent
Newman

(10) Patent No.: US 10,245,924 B2
(45) Date of Patent: Apr. 2, 2019

(54) AUTOMATIC VEHICLE CABIN AIR FILTRATION SYSTEM

(71) Applicant: NIO USA, Inc., San Jose, CA (US)

(72) Inventor: Austin Newman, San Jose, CA (US)

(73) Assignee: NIO USA, Inc., San Jose, CA (US)

( * ) Notice: Subject to any disclaimer, the term of this patent is extended or adjusted under 35 U.S.C. 154(b) by 53 days.

(21) Appl. No.: 15/340,225

(22) Filed: Nov. 1, 2016

(65) Prior Publication Data

US 2018/0037093 A1    Feb. 8, 2018

Related U.S. Application Data

(60) Provisional application No. 62/369,795, filed on Aug. 2, 2016.

(51) Int. Cl.
| | |
|---|---|
| *B60H 3/00* | (2006.01) |
| *B01D 46/46* | (2006.01) |
| *B01D 46/44* | (2006.01) |
| *B60H 3/06* | (2006.01) |

(52) U.S. Cl.
CPC ......... *B60H 3/0078* (2013.01); *B01D 46/442* (2013.01); *B01D 46/46* (2013.01); *B60H 2003/0683* (2013.01)

(58) Field of Classification Search
CPC .. B60H 1/00764; B60H 1/008; B60H 1/0071; B60H 1/00792; B60H 1/00771; B60H 1/00821; B60H 1/00735; G95B 15/02; B60W 50/0098

USPC ....... 55/385, DIG. 34; 454/75; 95/2; 96/417, 96/423, 424

See application file for complete search history.

(56) References Cited

U.S. PATENT DOCUMENTS

| | | | |
|---|---|---|---|
| 3,722,182 A | 3/1973 | Gilbertson | |
| 9,676,250 B2 * | 6/2017 | Weast | B60H 1/00821 |
| 2007/0243808 A1 * | 10/2007 | Mathur | B60H 1/00764 454/75 |
| 2015/0032266 A1 * | 1/2015 | Weast | B60H 1/008 700/276 |
| 2015/0075371 A1 * | 3/2015 | Abate | B60H 3/0071 95/2 |
| 2016/0096412 A1 * | 4/2016 | Mankame | B60H 1/00792 165/11.2 |
| 2016/0176261 A1 * | 6/2016 | Khorana | B60H 1/008 165/248 |
| 2016/0280160 A1 * | 9/2016 | MacNeille | G05B 15/02 |
| 2016/0318368 A1 * | 11/2016 | Alger | B60H 1/00771 |
| 2017/0106715 A1 * | 4/2017 | Duan | B60H 1/00764 |
| 2017/0356835 A1 * | 12/2017 | Hoke | B60H 1/00735 |
| 2018/0057013 A1 * | 3/2018 | Mullett | B60W 50/0098 |

\* cited by examiner

*Primary Examiner* — Duane Smith
*Assistant Examiner* — Minh Chau T Pham
(74) *Attorney, Agent, or Firm* — Sheridan Ross P.C.

(57) ABSTRACT

A vehicle cabin air filtration system has an electronic air filter which removes unwanted air particles from air prior to or after entry into a vehicle cabin. The vehicle cabin air filtration system also has a sensor configured to generate a signal indicative of a parameter and a controller operatively connected to the electronic air filter and the sensor. The controller receives the signal indicative of the parameter from the sensor, compares the parameter to a stored condition, and selectively activates or deactivates the electronic air filter based on the comparison.

24 Claims, 3 Drawing Sheets

AUTOMATIC VEHICLE CABIN AIR FILTRATION SYSTEM

PRIORITY CLAIM

This application claims priority under 35 U.S.C. § 119 to U.S. Provisional Application No. 62/369,795, filed on Aug. 2, 2016 which is expressly incorporated by reference herein in its entirety.

FIELD OF INVENTION

The present invention relates to a vehicle cabin air filtration system, and, more particularly, to vehicle cabin air filtration systems that automatically initiate cabin air filtration based on a detected condition.

BACKGROUND

Some vehicles include a cabin air filtration system which filters the air that enters the vehicle interior through the vehicle's heating, ventilation, and air conditioning system. The air filtration system removes particles from the air to help prevent allergens, bacteria, and other harmful or odor-producing materials from being introduced into the cabin. In this way, the air that enters the cabin through the HVAC system is clean.

Some vehicles use passive filters which include filter media positioned in the air flow to trap airborne particles. While these systems help, they are inefficient and require monitoring and replacement. Moreover, when the filter media becomes saturated with removed material, it may be a hazard which introduces material and odors into the cabin.

Other cabin air filtration systems are electronic and may use air handling components to direct air flow through a filter. The filter may use ionization to attract and remove unwanted particles, thereby removing harmful and odor-producing material from the air before introducing it into the cabin. U.S. Pat. No. 3,722,182 ("the '182 Patent") describes an example of an electronic air filtrations system. Other electronic systems may be standalone parts which are placed in a cabin and filter the air after it has already entered. While these electronic air filtration systems are effective at removing unwanted particles from the air, current designs are less than ideal. In particular, these systems are typically only activated when a user turns them on or plugs them into a power source. For example, the air filtration system in the '182 Patent includes a switch for powering on the system. This means that a user must determine when to turn on the filtration system, which would usually be after unwanted particles have already entered into the cabin. Moreover, this type of system or always-on systems may be left on when air filtration is unnecessary, leading to a waste of energy.

The present disclosure is directed to overcoming these and other problems of the prior art.

SUMMARY

In one aspect, the present disclosure is directed to a vehicle cabin air filtration system. The vehicle cabin air filtration system includes an electronic air filter which removes unwanted air particles from air prior to or after entry into a vehicle cabin. The vehicle cabin air filtration system also includes a sensor configured to generate a signal indicative of a parameter and a controller operatively connected to the electronic air filter and the sensor. The controller is configured to receive the signal indicative of the parameter from the sensor, compare the parameter to a stored condition, and selectively activate or deactivate the electronic air filter based on the comparison.

In another aspect, the presented disclosure is directed to a vehicle. The vehicle includes a vehicle body defining a vehicle cabin. The vehicle further includes a ventilation system. The ventilation system includes an air inlet at an interface between the vehicle body and an outside environment, and an air outlet at an interface between the vehicle body and the vehicle. The ventilation system further includes a channel which directs an air flow from the air inlet toward the air outlet. The vehicle further includes a cabin air filtration system. The cabin air filtration system includes an electronic air filter configured to remove unwanted particles from the air flow, a sensor configured to generate a signal indicative of a parameter, and a controller operatively connected to the electronic air filter and the sensor. The controller is configured to receive the signal indicative of the parameter from the sensor, compare the parameter to a stored condition, and selectively activate or deactivate the electronic air filter based on the comparison.

In yet another aspect, the present disclosure is directed to another vehicle cabin air filtration system. The vehicle cabin air filtration system includes an electronic air filter configured to remove unwanted particles from air, a location sensor configured to generate a signal indicative of a location of the vehicle, and an air quality sensor configured to generate a signal indicative of an air quality parameter. The cabin air filtration system further includes a controller operatively connected to the electronic air filter and the sensor. The controller is configured to receive the signal indicative of the location of the vehicle from the location sensor and the signal indicative of the air quality parameter from the air quality sensor, compare the location of the vehicle and the air quality parameter to stored conditions, and selectively activate or deactivate the electronic air filter based on the comparison.

BRIEF DESCRIPTION OF THE DRAWING(S)

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENT(S)

The present disclosure relates to a cabin air filtration system which includes a control system configured to automatically activate and deactivate air filtration. The control system includes at least one sensor which monitors parameters, such as environmental conditions which are used by a controller to determine whether action should be taken to activate or deactivate air filtration. The determination may be based on a location of the vehicle in comparison to known poor air quality zones, for instance. In another example, the determination may be based on a detection of poor quality air. Exemplary embodiments of the automatic cabin air filtration system are described in further detail below.

Figure 1:
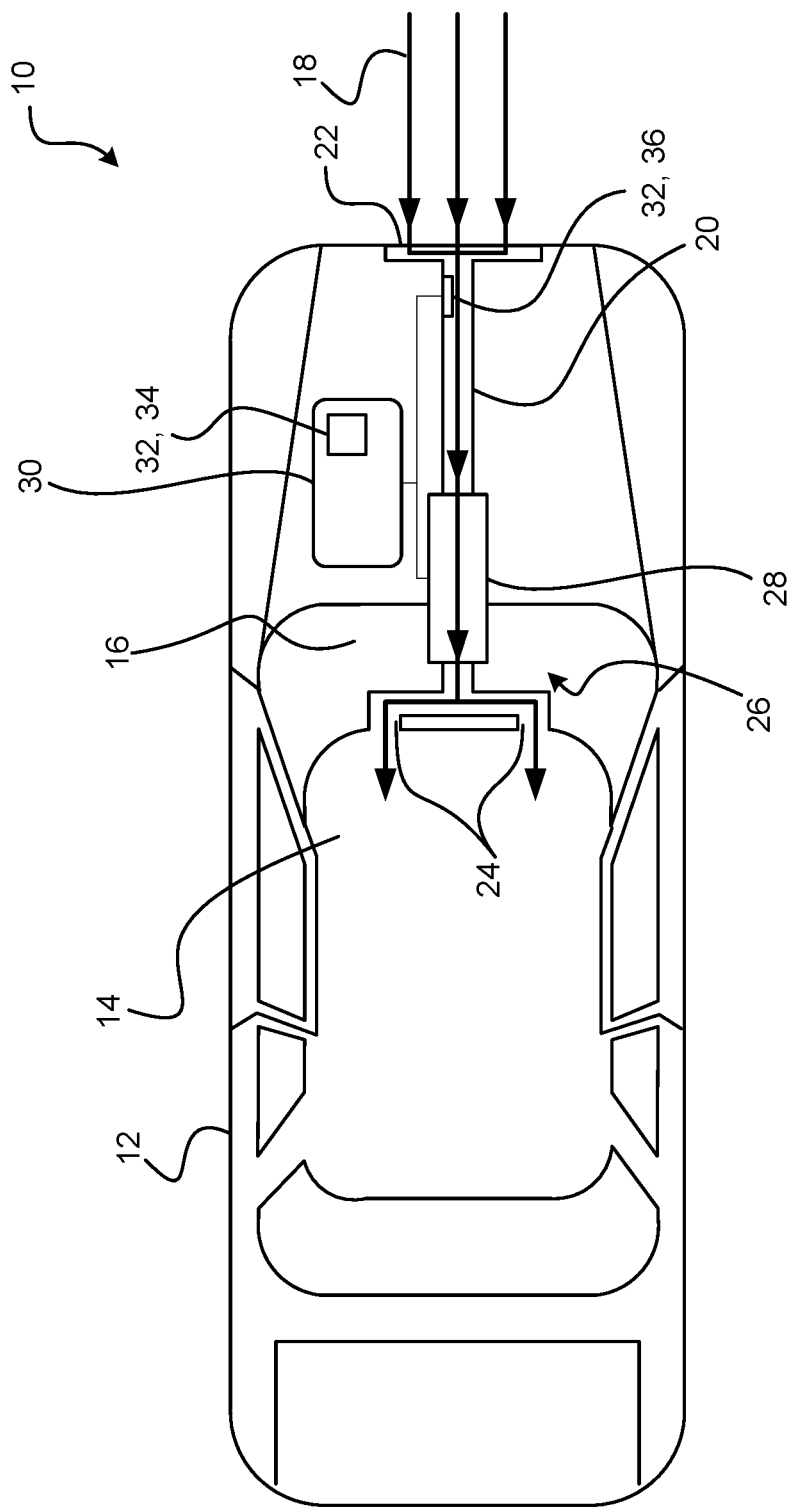
FIG. 1 is a schematic illustration of a vehicle having a cabin air filtration system.

FIG. 1 is a schematic illustration of an exemplary vehicle 10, consistent with disclosed embodiments. The vehicle 10 includes a body 12 which defines a vehicle interior cabin 14. The cabin 14 is the passenger area of the vehicle 10, including space for a driver and/or passengers. The vehicle 10 further includes a ventilation system 16. The ventilation system 16 controls an air flow 18 into and out of the cabin 14.

The ventilation system 16 includes at least one channel 20 which delivers air from an exterior of the vehicle 10. For example, the channel 20 may include an inlet 22 at an interface between the vehicle body 12 and the outside environment (e.g., a grille area, hood scoop, etc.) which receives air and at least one air outlet 24 at an interface between the vehicle body 12 and the space that defines the cabin 14 (e.g., a dashboard vent or the like). The air flow 18 travels from the inlet 22 to the outlet 24 such that air which was outside of the vehicle 10 reaches the cabin 14.

It should be understood that ventilation system 16 and channel 20 may be part of a more complex system, such as a heating, ventilation, and air conditioning (HVAC) system of the vehicle configured to selectively heat and cool the air flow 18. The channel 20 may represent multiple channels, ducts, conduits, etc., which make up such an HVAC system. The system may include conventional HVAC components, such as a condenser, compressor, blower, motor, fan, heat exchanger, etc. The channel 20 is configured to direct the air flow 18 from the air inlet 22 toward the air outlet 24, which may include the air flow 18 traveling through one or more components or systems (e.g., HVAC systems) before reaching the air outlet 24.

The vehicle 10 further includes a cabin air filtration system 26. The cabin air filtration system 26 is configured to clean the air flow 18, such as to remove unwanted particles from the air. By removing the unwanted particles, the air flow 18 may be more suitable for breathing by individuals in the cabin 14. For example, the cabin air filtration system 26 may remove harmful gasses or compounds, dust particles, allergens, odors, etc.

The cabin air filtration system 26 preferably includes an electronic air filter 28, a controller 30, and at least one sensor 32. The electronic air filter 28 is preferably an electrically-powered filtering device which removes target particles from air in a conventional manner. For example, the electronic air filter 28 may utilize ionization, magnets, voltage pulses, or other known mechanisms for removing the particles. In other embodiments, the electronic air filter 28 is a passive filter (e.g., fixed filter media) which is only introduced into the air flow 18 upon activation of some electronically controlled element. For example, air flow 18 may be selectively diverted through the passive filter through electronic activation or deactivation. Thus, an "electronic" air filter 28 refers to a filtering element which is controlled electronically and does not necessarily filter electronically. As used herein, "unwanted" particles refer to foreign particles in the air which are not a constituent particle of basic environmental air. These particles are not limited to toxic, noxious, or odorous particles and may be any target particle, compound, molecule, gas, solid, etc., which the electronic air filter 28 is configured to remove or otherwise separate from the remainder of the air.

The controller 30 is preferably a computing device configured to execute software instructions to perform an action. The controller 30 may include computing components such as a processor, memory, I/O devices, database, etc. stores the location (e.g., GPS coordinates) of the poor air quality zone 30. The controller 30 may be configured to communicate with the electronic air filter 28. Additionally or alternatively, the controller 30 may be configured to wirelessly communicate with the electronic air filter 28 (e.g., via WiFi, Bluetooth®, cellular network, etc.). The electronic air 28 filter may include computing components (e.g., processer, memory, I/O devices, database, etc.).

In some embodiments, the controller 30 may be a component of a mobile device, such as smart device (e.g., phone, watch, PDA, etc.). The mobile device may be configured to wirelessly communicate (e.g., via the controller 30) with the electronic air filter 28. In some embodiments, the mobile device may include a separate controller configured to wirelessly communicate with the controller 30 (e.g., when the controller 30 is an on-board vehicle computer). Similarly, the vehicle 10 may include a separate controller configured to wirelessly communicate with the controller 30 (e.g., when the controller 30 is a component of a mobile device).

The controller 30 is electronically connected (e.g., via a wired or wireless connection) with the sensors 32. The sensors 32 are configured to generate a signal indicative of a parameter. While two sensors 32 are shown in described, it should be understood that the cabin air filtration system 26 may include any number of sensors 32. In an exemplary embodiment, the sensors 32 include at least one of a location sensor 34 and an air quality sensor 36.

The location sensor 34 is preferably configured to determine a location of the vehicle 10. For example, the location sensor 34 may be a GPS device configure identify location parameters (e.g., coordinates) of the vehicle 10. In some embodiments, the location sensor 34 is attached to the vehicle body 12 or another component of the vehicle 10. For example, the location sensor 34 may be a component of an on-board computing system of the vehicle 10. In another embodiment, the location sensor 34 is a component of a mobile device, such as a smart device.

The air quality sensor 36 is preferably configured to detect an air quality parameter. In an exemplary embodiment, the detectable air quality parameter is an amount of a selected constituent material present in the air flow 18. For example, the air quality sensor 36 may be configured to detect an amount of a target particle in the air flow 18. For example, the air quality sensor 36 may be configured to detect an amount of carbon monoxide, sulfuric gas, hydrocarbons, and nitrogen oxide, ozone, particulate matter, and volatile organic compounds. Detecting an amount may include detecting a presence (e.g., an amount greater than zero) of a constituent material. The air quality sensor 36 may use optical, electrochemical, semiconductor, oxidation, ionization, or electricity sensing technology, for example.

In an exemplary embodiment, the sensors 32 are configured to generate a signal indicative of a parameter and transmit the signal to the controller 30. The controller 30 is configured to compare the parameter to a stored condition. The stored condition may be stored in a memory or database, for example. Consistent with disclosed embodiments, the comparison allows the controller 30 to identify situations in which the electronic air filter 28 should be activated or deactivated. For example, the comparison allows the controller 30 to identify situations in which the air flow 18 contains or is likely to contain unwanted particles such that the air flow has poor air quality. As used herein, "poor air quality" refers to air that contains unwanted particles. Based on the comparison, the controller 30 is configured to selectively activate and/or deactivate the electronic air filter 28, such as to remove the unwanted particles.

Figure 2:
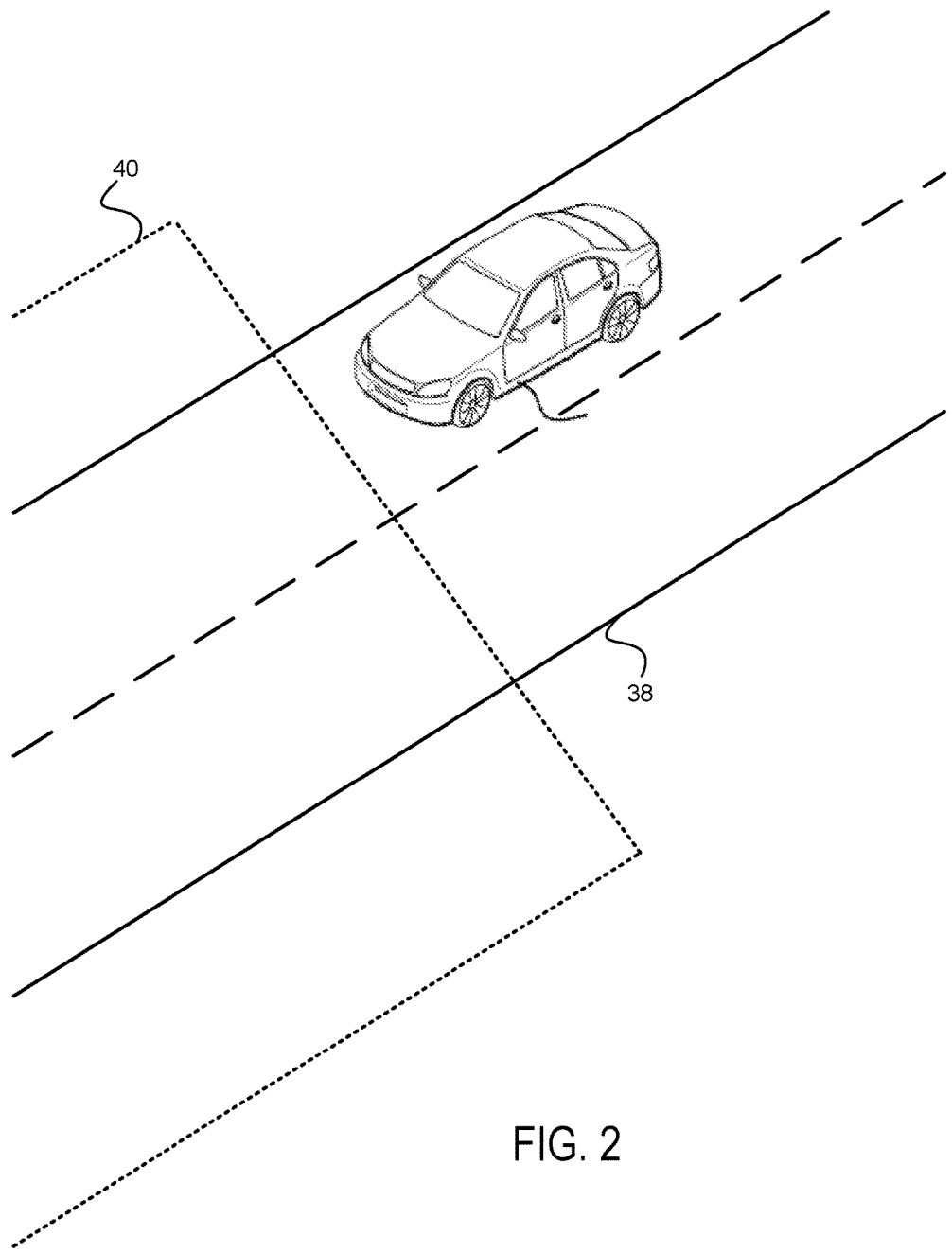
FIG. 2 is a depiction of a vehicle traveling into an area which is designated as a poor air quality zone.

FIG. 2 illustrates a first exemplary situation in which the controller 30 may automatically control the electronic air filter 28 to activate and/or deactivate air filtration. In FIG. 2, the vehicle 10 travels on a road 38 and approaches a poor air quality zone 40. The poor air quality zone 40 corresponds to a geographical location in which there is or is likely to be poor air quality. For example, the poor air quality zone 40 may correspond to a city or an area around a factory or power plant. In another example, the poor air quality zone 40 may correspond to a highway or area where exhaust-emitting vehicles are frequently located in a high volume. Poor air quality zone 40 may also correspond to an area in which noxious odors exist, such as areas near a landfill. The poor air quality zone 40 can correspond to any area and is merely a designation of an area in which it would be desirable to use electronic air filter 28.

In an exemplary embodiment, the controller 30 stores location parameters associated with one or more poor air quality zones 40 as the stored condition. In this way, the controller 30 can compare the location of the vehicle 10 (e.g., collected by the location sensor 34) to the stored condition in order to determine the location of the vehicle 10 in relation to the one or more poor air quality zones 40. The controller 30 is configured to selectively activate or deactivate the electronic air filter 28 based on the comparison. In some embodiments, the controller 30 (or another controller in communication with the controller 30) may store location parameters remotely from the vehicle 10. These embodiments may include wireless communication between onboard and offboard computing devices in order to determine when the vehicle 10 is in a poor air quality zone 40.

In an exemplary embodiment, the controller 30 is configured to selectively activate or deactivate the electronic air filter 28 based on a determination that the vehicle 10 is approaching the poor air quality zone 40. For example, the controller 30 may determine (e.g. based on a running location of the vehicle, direction of the vehicle, speed of the vehicle) that the vehicle is going to enter a poor air quality zone 40 and activate the electronic air filter 28 such that the electronic air filter 28 is running when the vehicle 10 enters the poor air quality zone 40. In another example, the controller 30 may store roads and/or road landmarks and determine that the vehicle 10 is approaching a poor air quality zone based on a location of the vehicle 10 on the road and/or in comparison to a landmark. In an alternative embodiment, the controller 30 may be configured to activate the electronic air filter 28 when the vehicle 10 is in the poor air quality zone 40.

Similarly, the controller 30 is configured to deactivate the electronic air filter 28 when the vehicle 10 is outside of the poor air quality zone 40. For example, the controller 30 may determine that the electronic air filter 28 is running and that the vehicle 10 is outside of the poor air quality zone 40 and proceed to deactivate the electronic air filter 28.

Through use of the electronic air filter 28, the controller 30, and the location sensor 34, the cabin air filtration system 26 is configured to automatically switch the air filtration on and off depending on whether the vehicle 10 is in an area known to have poor air quality or the potential for poor air quality. The controller 30 then may proactively turn on electronic air filtering such that the air flow 18 is filtered prior to the unwanted particles entering into the vehicle cabin 14.

Figure 3:
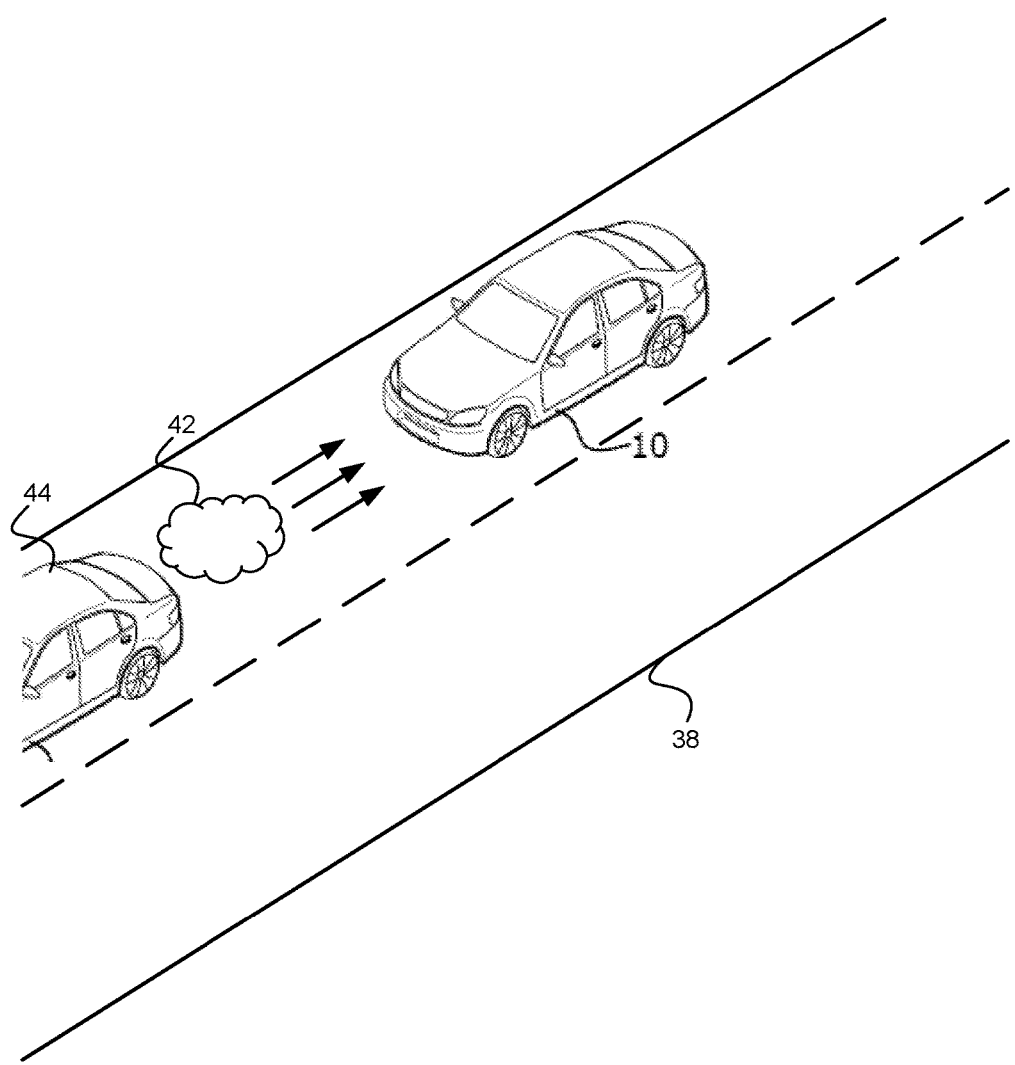
FIG. 3 is a depiction of a vehicle traveling in an environment in which poor quality air is present.

FIG. 3 illustrates a second exemplary situation in which the controller 30 may automatically control the electronic air filter 28 to activate and/or deactivate air filtration. In FIG. 3, the vehicle 10 travels on the road 38 and air having poor quality 42 is present in the vicinity. For example, another vehicle 44 may be present, the another vehicle emitting exhaust that enters the air inlet 22 of the vehicle 10.

In an exemplary embodiment, the parameter detected by the air quality sensor 36 is an air quality parameter. The air quality parameter may be an amount of a selected constituent material present in an the air flow 18. In addition, the stored condition stored by the controller 30 may be a threshold amount of the selected constituent material. In this way, the cabin air filtration system 26 is configured to determine the existence of unwanted particles in the air flow 18.

The controller 30 is configured to activate or deactivate the electronic air filter 28 based on the detection of the selected constituent material. For example, the controller 30 is configured to compare the parameter detected by the air quality sensor 36 to a stored condition, by which the controller 30 compares the detected amount of the selected constituent material to the threshold amount of the selected constituent material. In other words, if unwanted particles are detected in the air flow 18, the controller 30 is configured to activate the electronic air filter 28 when the amount of the selected constituent material exceeds a threshold amount of the selected constituent material. Similarly, once the air having poor quality 42 is no longer in the air flow 18, the controller 30 is configured to deactivate the electronic air filter 28. For example, the controller 30 is configured to deactivate the electronic air filter 28 when the detected amount of the selected constituent material is less than the threshold amount of the selected constituent material. The air quality sensor 36 may be positioned in the channel 20 upstream from the electronic air filter 28 such that air filtration may be activated prior to the unwanted particles reaching the vehicle cabin 14.

The controller 30 may store multiple thresholds for different unwanted particles, such as when the air quality sensor 36 is configured to detect multiple different materials. In this way, the cabin air filtration system 26 is configured to selectively control air filtration when different types of air having poor quality are detected. The constituent materials that are detected and compared to threshold amounts may include, for example, carbon monoxide, sulfuric gas, hydrocarbons, and nitrogen oxide, ozone, particulate matter, and volatile organic compounds. It should be understood that the threshold amount may be zero such that mere detection of a constituent material may cause selective activation of air filtration.

In some embodiments, the cabin air filtration system 26 may use both the location sensor 34 and the air quality sensor 36 to selectively control the electronic air filter 28. For example, the controller 30 may monitor a location of the vehicle 10 and the surrounding air conditions when determining whether to activate or deactivate the electronic air filter 28.

In some embodiments, the controller 30 may use data collected from air quality sensor 36 to identify poor air quality zones. For example, the controller 30 may transmit air quality data gathered by the air quality sensor 36 to a centralized computing device (e.g., which may be a component of the vehicle cabin air filtration system 26) which may be remote from the vehicle 10. The centralized computing device may "learn" poor air quality zones 40 based on data collected from one or more vehicles 10.

For example, the centralized computing device may aggregate air quality data from multiple vehicles to identify locations where poor air quality is repeatedly reported. The centralized computing device may use this information to store location parameters which correspond to a poor air quality zone 40 and which is subsequently used by controller 30 to selectively activate and deactivate the electronic air filter 28 based on a location of the vehicle 10 in comparison to the poor air quality zone 40 created based on the collected air quality data.

The disclosed embodiments provide automatic air filtration control. This helps to promote efficient use of the vehicle systems and also provides a proactive approach to achieving air filtration rather than the typical reactive approach where the user first smells or otherwise recognizes the environment and reacts by turning on the in-cabin filtration. Moreover, energy is not wasted running the electronic air filter when it is not needed.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A vehicle cabin air filtration system, comprising:
   an electronic air filter configured to remove unwanted particles from an air flow received from an exterior of the vehicle;
   a location sensor configured to generate a signal indicative of a geographical location of the vehicle in an environment; and
   a controller operatively connected to the electronic air filter and the sensor, the controller configured to:
     receive the signal indicative of the geographical location of the vehicle from the sensor;
     compare the geographical location of the vehicle to a known stored geographical location of a poor air quality zone in the environment; and
     selectively activate or deactivate the electronic air filter based on the comparison.

2. The vehicle cabin air filtration system of claim 1, wherein the electronic air filter uses one or more of ionization, magnets, and voltage pulses to remove the unwanted particles from the air flow.

3. The vehicle cabin air filtration system of claim 2, wherein the location sensor is one or more of attached to a body or on board component of the vehicle and included in a mobile device of a vehicle occupant and wherein the stored geographical location of the poor air quality zone in the environment includes location coordinates associated with the poor air quality zone and the controller is configured to compare the location of the vehicle to the location coordinates and determine the location of the vehicle relative to the geographical location of the poor air quality zone.

4. The vehicle cabin air filtration system of claim 3, wherein the comparison allows the controller to identify a first situation in which the air flow contains or is likely to contain at least a threshold amount of unwanted particles and a second situation in which the air flow does not contain or is not likely to contain at least the threshold amount of unwanted particles, and wherein selectively activating or deactivating the electronic air filter includes activating the electronic air filter based on a determination that the vehicle is approaching the poor air quality zone.

5. The vehicle cabin air filtration system of claim 3, wherein the comparison allows the controller to identify a first situation in which the air flow contains or is likely to contain at least a threshold amount of unwanted particles and a second situation in which the air flow does not contain or is not likely to contain at least the threshold amount of unwanted particles, and wherein selectively activating or deactivating the electronic air filter includes activating the electronic air filter based on a determination that the vehicle is in the poor air quality zone.

6. The vehicle cabin air filtration system of claim 3, wherein the comparison allows the controller to identify a first situation in which the air flow contains or is likely to contain at least a threshold amount of unwanted particles and a second situation in which the air flow does not contain or is not likely to contain at least the threshold amount of unwanted particles, and wherein selectively activating or deactivating the electronic air filter includes deactivating the electronic air filter based on a determination that the vehicle is outside of the poor air quality zone.

7. The vehicle cabin air filtration system of claim 2, wherein the comparison allows the controller to activate the electronic air filter when the air flow contains or is likely to contain at least a threshold amount of unwanted particles and deactivate the electronic air filter when the air flow does not contain or is not likely to contain at least the threshold amount of unwanted particles, and wherein the location sensor is a component of a mobile device which is configured to wirelessly communicate with the controller or the electronic air filter.

8. The vehicle cabin air filtration system of claim 7, wherein the geographical location of the poor air quality zone is based on aggregated air quality data received from multiple vehicles and wherein the mobile device includes the controller, the controller being configured to transmit a wireless signal to selectively activate or deactivate the electronic air filter.

9. The vehicle cabin air filtration system of claim 8, wherein the mobile device is a smart device configured to execute one or more mobile applications which provide automatic control of the electronic air filter via wireless communication.

10. The vehicle cabin air filtration system of claim 1, further comprising an air quality sensor configured to generate a signal indicative of an air quality parameter associated with an amount of a selected constituent material present in the air flow received from the exterior of the vehicle, wherein the electronic air filter is a passive filter, and wherein, in a first mode in which the parameter has a first value indicating that the unwanted particle is in the air flow in at least a threshold concentration, the controller directs the air flow through the electronic air filter and, in a second mode in which the parameter has a second value indicating that the unwanted particle is in the air flow in less than the threshold concentration, the controller does not direct the air flow through the electronic air filter.

11. The vehicle cabin air filtration system of claim 10, wherein the air quality parameter is an amount of a selected constituent material present in the air flow and wherein the selected constituent material is one or more of carbon monoxide, sulfuric gas, hydrocarbon, nitrogen oxide, ozone, particulate matter, and volatile organic compound.

12. The vehicle cabin air filtration system of claim 11, wherein the controller is further configured to compare the amount of the selected constituent material to a stored threshold amount of the selected constituent material.

13. The vehicle cabin air filtration system of claim 12, wherein selectively activating or deactivating the electronic air filter includes activating the electronic air filter when the amount of the selected constituent material exceeds the threshold amount of the selected constituent material.

14. The vehicle cabin air filtration system of claim 12, wherein selectively activating or deactivating the electronic air filter includes deactivating the electronic air filter when the amount of the selected constituent material is less than the threshold amount of the selected constituent material.

15. The vehicle cabin air filtration system of claim 11, wherein the selected constituent material is selected from the group consisting of carbon monoxide, sulfuric gas, hydrocarbons, and nitrogen oxide, ozone, particulate matter, and volatile organic compounds.

16. A vehicle, comprising:
a vehicle body defining a vehicle cabin; and
a ventilation system including:
an air inlet at an interface between the vehicle body and an outside environment, the air inlet to receive an air flow;
an air outlet at an interface between the vehicle body and the vehicle to output the air flow; and
a channel which directs the air flow from the air inlet toward the air outlet; and
a cabin air filtration system including:
an electronic air filter configured to remove unwanted particles from the air flow;
a location sensor configured to generate a signal indicative of a geographical location of the vehicle; and
a controller operatively connected to the electronic air filter and the sensor, the controller configured to:
receive the signal indicative of the geographical location of the vehicle from the sensor;
compare the geographical location of the vehicle to a known stored geographical location of a poor air quality zone; and
selectively activate or deactivate the electronic air filter based on the comparison.

17. The vehicle of claim 16, wherein the ventilation system is part of a vehicle HVAC system configured to selectively heat and cool the air flow and wherein the electronic air filter uses one or more of ionization, magnets, and voltage pulses to remove the unwanted particles from the air flow.

18. The vehicle of claim 16, wherein the electronic air filter is a passive filter, and wherein, in a first mode in which the parameter has a first value indicating that an unwanted particle is in the air flow in at least a threshold concentration, the controller directs the air flow through the electronic air filter and, in a second mode in which the parameter has a second value indicating that the unwanted particle is in the air flow in less than the threshold concentration, the controller does not direct the air flow through the electronic air filter.

19. The vehicle of claim 18, wherein the comparison allows the controller to identify a first situation in which the air flow contains or is likely to contain at least a threshold amount of unwanted particles and a second situation in which the air flow does not contain or is not likely to contain at least the threshold amount of unwanted particles, and wherein the location sensor is a component of a mobile device which is configured to wirelessly communicate with the controller or the electronic air filter.

20. The vehicle of claim 16, wherein the comparison allows the controller to activate the electronic air filter when the air flow contains or is likely to contain at least a threshold amount of unwanted particles and deactivate the electronic air filter when the air flow does not contain or is not likely to contain at least the threshold amount of unwanted particles, wherein the ventilation system further comprises an air quality sensor configured to generate a signal indicative of an air quality parameter associated with an amount of a selected constituent material present in the air flow, and wherein the electronic air filter uses one or more of ionization, magnets, and voltage pulses to remove the unwanted particles from the air flow.

21. A vehicle cabin air filtration system, comprising:
an electronic air filter that removes unwanted particles from an air flow;
a location sensor that generates a signal indicative of a geographical location of the vehicle while traveling in an environment;
an air quality sensor that generates a signal indicative of an air quality parameter associated with the air flow; and
a controller operatively connected to the electronic air filter and the sensor, wherein the controller:
receives the signal indicative of the geographical location of the vehicle from the location sensor and the signal indicative of the air quality parameter from the air quality sensor;
compares the geographical location of the vehicle and the air quality parameter to stored conditions; and
selectively activate or deactivate the electronic air filter based on the comparison.

22. The vehicle cabin air filtration system of claim 21, wherein the controller is configured to collect air quality data from the air quality sensor and a geographical location associated with the collected air quality data and determine a geographical location of a poor air quality zone based on the collected air quality data, wherein the geographical location of the poor air quality zone is based on aggregated air quality data measured from multiple vehicles, and wherein the electronic air filter uses one or more of ionization, magnets, and voltage pulses to remove the unwanted particles from the air flow.

23. The vehicle cabin air filtration system of claim 22, wherein the comparison allows the controller to identify a first situation in which the air flow contains or is likely to contain at least a threshold amount of unwanted particles and a second situation in which the air flow does not contain or is not likely to contain at least the threshold amount of unwanted particles, wherein the electronic air filter is a passive filter, wherein, in the first situation, the controller directs the air flow through the electronic air filter and, in the second situation, the controller does not direct the air flow through the electronic air filter, and wherein the controller collects air quality data from a plurality of air quality sensors on a plurality of vehicles.

24. The vehicle air filtration system of claim 22, wherein the comparison allows the controller to activate the electronic air filter when the air flow contains or is likely to contain at least a threshold amount of unwanted particles and deactivate the electronic air filter when the air flow does not contain or is not likely to contain at least the threshold amount of unwanted particles, and wherein the controller stores geographical location coordinates associated with the geographical location of the poor air quality zone as one of the stored conditions and the controller selectively activates or deactivates the electronic air filter includes activating the electronic air filter based on a determination that the vehicle is approaching the geographical location of the poor air quality zone.

* * * * *

UNITED STATES PATENT AND TRADEMARK OFFICE
CERTIFICATE OF CORRECTION

PATENT NO. : 10,245,924 B2
APPLICATION NO. : 15/340225
DATED : April 2, 2019
INVENTOR(S) : Austin Newman Page 1 of 1

It is certified that error appears in the above-identified patent and that said Letters Patent is hereby corrected as shown below:

In the Claims

At Column 10, Line 33, please delete "activate" and insert --activates-- therein.

At Column 10, Line 33, please delete "deactivate" and insert --deactivates-- therein.

Signed and Sealed this
Twenty-ninth Day of October, 2019

Andrei Iancu
*Director of the United States Patent and Trademark Office*